US 7,630,587 B2

(12) United States Patent
Sugiyama

(10) Patent No.: US 7,630,587 B2
(45) Date of Patent: Dec. 8, 2009

(54) OPTICAL WAVEGUIDE DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/110,553

(22) Filed: Apr. 28, 2008

(65) Prior Publication Data

US 2008/0317399 A1    Dec. 25, 2008

(30) Foreign Application Priority Data

Jun. 22, 2007    (JP) .............................. 2007-165002

(51) Int. Cl.
  *G02F 1/035*    (2006.01)
  *G02F 1/225*    (2006.01)
(52) U.S. Cl. .............................................. 385/3; 385/2
(58) Field of Classification Search .................... None
  See application file for complete search history.

(56) References Cited

U.S. PATENT DOCUMENTS

| 6,781,741 B2 | 8/2004 | Uesaka | |
| 2002/0141679 A1* | 10/2002 | Dol et al. ........................ | 385/2 |
| 2003/0210912 A1* | 11/2003 | Leuthold et al. ............. | 398/188 |
| 2003/0219188 A1* | 11/2003 | Doi et al. ........................ | 385/3 |
| 2004/0208429 A1 | 10/2004 | Gill et al. | |
| 2005/0213863 A1* | 9/2005 | Sugiyama et al. .............. | 385/2 |
| 2006/0147219 A1 | 7/2006 | Yoshino et al. | |
| 2006/0159384 A1* | 7/2006 | Sugiyama ....................... | 385/3 |
| 2008/0056637 A1* | 3/2008 | Sugiyama ....................... | 385/3 |

FOREIGN PATENT DOCUMENTS

| JP | 2003-255283 | 9/2003 |
| JP | 2005-77987 | 3/2005 |
| JP | 2006-195256 | 7/2006 |
| WO | WO 2005/008923 | 1/2005 |

OTHER PUBLICATIONS

X. Wei et al. Delay-interferometer-based optical pulse generator. Optical Fiber Communication Conference 2004, WL6, Feb. 2004.*
C. Lee et al. Passive all optical non-return-to-zero to pseudo-random-return-to-zero signal conversion for all optical clock recovery. Lasers and Electro-Optics Society Annual Meeting 1996, vol. 2, pp. 113-114, Nov. 1996.*
Peter J. Winzer, et al., "Return-to-Zero Modulator Using a Single NRZ Drive Signal and an Optical Delay Interferometer", IEEE Photonics Technology Letters, vol. 13, No. 12, Dec. 2001.
Xing Wei, et al., "Delay-Interferometer-Based Optical Pulse Generator", Optical Fiber Communication Conference (OFC), 2004, XP002489465.
European Search Report mailed Aug. 18, 2008 for corresponding European Patent Application No. 08008941.0.

* cited by examiner

*Primary Examiner*—Mike Stahl
(74) *Attorney, Agent, or Firm*—Staas & Halsey

(57) ABSTRACT

An optical waveguide device is disclosed wherein the modulation efficiency for a driving voltage is improved. The optical waveguide device includes a substrate having an electro-optic effect, an optical waveguide formed on the substrate, an electrode section adapted to supply an electric field for carrying out phase modulation synchronized with a clock signal to the optical waveguide, and a Mach-Zehnder interferometer connected to the downstream side of the optical waveguide and including two branching waveguides having optical lengths different from each other.

14 Claims, 14 Drawing Sheets

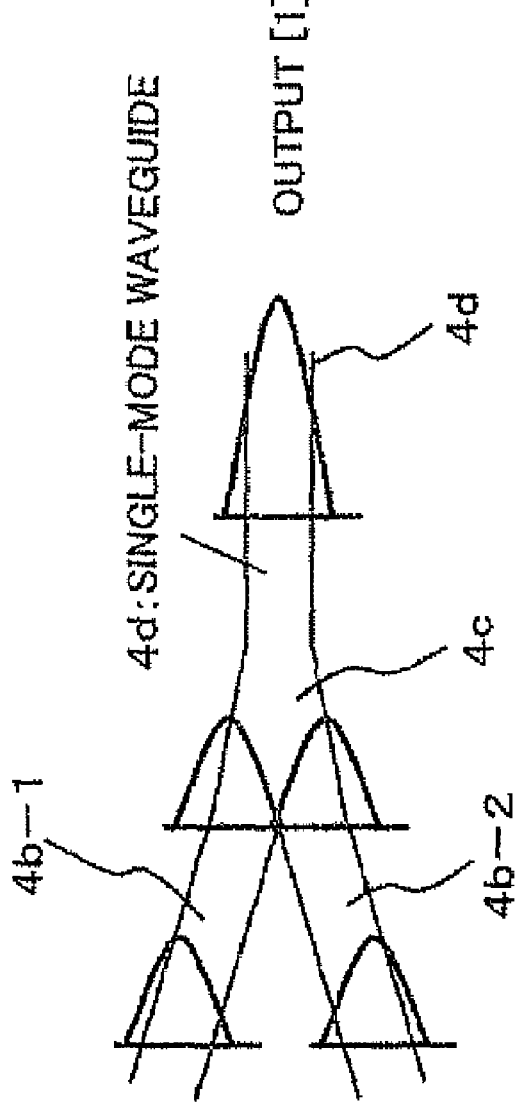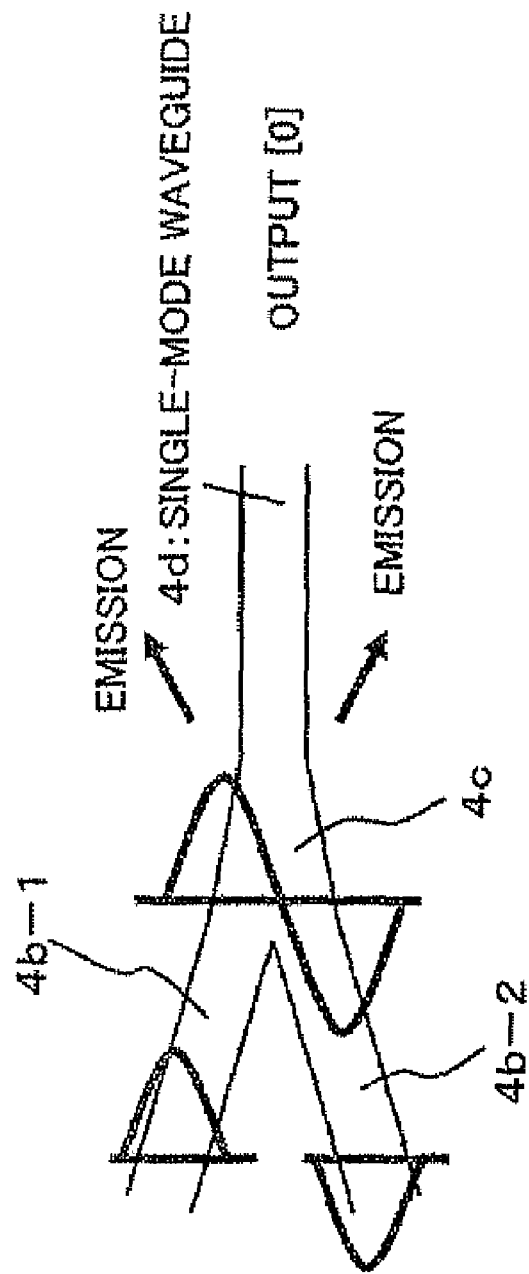
FIG. 3(a)
FIG. 3(b)

OPTICAL WAVEGUIDE DEVICE

CROSS REFERENCE TO RELATED APPLICATION

This application is based on and hereby claims priority to Japanese Application No. 2007-165002 filed on Jun. 22, 2007 in Japan, the contents of which are hereby incorporated by reference.

BACKGROUND OF THE INVENTION

1) Field of the Invention

The present invention relates to an optical waveguide device suitable for use with optical communication.

2) Description of the Related Art

An optical waveguide device having a substrate made of electro-optical crystal of lithium niobate ($LiNbO_3$, hereinafter referred to simply as LN), $LiTaO_2$ or the like is formed by forming a metal film on part of a crystal substrate and then carrying out thermal diffusion or by forming an optical waveguide by means of proton exchange in benzoic acid or the like after patterning and then providing an electrode in the proximity of the optical waveguide. Then, an electrode for providing refraction index variation to light propagating in the optical waveguide is formed on the electro-optical crystal on which such an optical waveguide as just described is formed so that an optical device for performing optical modulation can be formed.

An electro-optical modulator in which a ferroelectrics material such as LN described above is used has been placed into practical use already in an optical communication system and so forth, and also marketing of a high-speed optical modulator which can modulate an optical wave with a high-frequency electric signal, for example, of approximately 40 GHz is advancing.

FIG. 12 is a schematic top plan view showing, as an example of the high-speed optical modulator described above, a clock modulator 100 used in a CS-RZ (Carrier Suppressed Return to Zero) modulation method or the like. FIG. 14 is a schematic top plan view showing a CS-RZ optical modulator 110 to which the clock modulator 100 shown in FIG. 12 is applied.

The clock modulator 100 shown in FIG. 12 includes a Z-cut substrate (LN substrate) 101 formed, for example, from lithium niobate which is electro-optical crystal, an optical waveguide device 100A formed on the LN substrate 101 and including a Mach-Zehnder type optical waveguide 102, a signal electrode 103 and ground electrodes 104, and a clock signal source 105 for generating a (high speed) clock signal to be supplied from the upstream side of the signal electrode 103 in a light propagation direction.

The Mach-Zehnder type optical waveguide 102 includes, for example, an input optical waveguide 102a, two interference optical waveguides 102b and an output optical waveguide 102c formed integrally with each other and is formed as a coplanar electrode from the signal electrode 103 and the ground electrodes 104. Where the Z-cut substrate 101 is used as in the clock modulator 100 shown in FIG. 12, generally the signal electrode 103 and one of the ground electrodes 104 are disposed just above the interference optical waveguide 102b in order to utilize refraction index variation by an electric field in the z direction.

Further, while the signal electrode 103 and the ground electrodes 104 are patterned above the interference optical waveguide 102b as described above, a buffer layer not shown is interposed between the substrate 101 and the signal electrode 103 and ground electrodes 104 in order to prevent absorption of light propagating in the interference optical waveguide 102b by the signal electrode 103 and the ground electrodes 104. As the buffer layer, for example, a $SiO_2$ layer having a thickness of 0.2 to 1 μm is used.

Where the clock modulator 100 configured in such a manner as described above is to be driven at a high speed, terminal ends of the signal electrode 103 and ground electrodes 104 are connected to each other through a resistor so as to form a traveling wave electrode, and a microwave signal is applied from the light input side of the traveling wave electrode. At this time, by electric field variation when an electric signal of microwaves is from the clock signal source 105 through the signal electrode 103 and the ground electrodes 104, the refraction indexes of the two interference optical waveguides 102b individually vary to +Δna and −Δnb.

Consequently, since the phase difference of light is varied by cyclical variation of the electric field in a process wherein CW (Continuous Wave) light inputted to the input optical waveguide 112a is branched into two lights and then the two lights propagate individually through the two interference optical waveguide 102b, intensity-modulated signal light is outputted from the output optical waveguide 102c.

FIG. 13 is a view illustrating an optical modulation characteristic of the clock modulator 100 shown in FIG. 12 with respect to the driving voltage. In a Mach-Zehnder type optical modulator such as the clock modulator 100 as shown in FIG. 13, the light intensity has a characteristic that it varies in a sinusoidal wave with respect to the applied voltage (refer to reference character A in FIG. 13). If an electric signal of 20 GHz having the voltage amplitude (2 V π) in one cycle of the sinusoidal wave is applied (refer to reference character B in FIG. 13), then a clock optical signal having a variation cycle of optical output power of 40 GHz can be outputted (refer to reference character C in FIG. 13).

Further, the CS-RZ optical modulator 110 shown in FIG. 14 is configured by integrally forming a clock modulation section 111 equivalent to the clock modulator 100 described hereinabove with reference to FIG. 12 and a data modulation section 112 on the same substrate 101 through a curved and folded back waveguide 113. The data modulation section 112 is formed from a Mach-Zehnder type optical waveguide 114 connected to the curved and folded back waveguide 113, a signal electrode 115 for applying an NRZ data electric signal of 40 Gb/s, and ground electrodes 104 provided around the signal electrode 115. It is to be noted that a groove 113a is formed along an outer periphery of the curved and folded back waveguide 113 in order to promote a confining effect of light propagating in the curved and folded back waveguide 113.

In the CS-RZ optical modulator 110 configured in such a manner as described above, inputted CW light is modulated into a clock optical signal of 40 GHz with a clock electric signal of 20 GHz by the clock modulation section 100, and the clock optical signal of 40 GHz inputted through the curved and folded back waveguide 113 is modulated into an RZ optical signal of 40 Gb/s with an NRZ data electric signal of 40 Gb/s by the data modulation section 112 so that the modulated optical signal can be outputted.

It is to be noted that it is also known that an effective refraction index of a microwave can be controlled by varying the sectional shape of the electrodes 103 and 14 so that the speeds of light and the microwave are matched with each other to obtain an optical response characteristic in a broadband.

Further, techniques relating to the present invention are disclosed in Japanese Patent Laid-Open No. 2006-195256

(hereinafter referred to as Patent Document 1), International Publication No. 2005/008923 (hereinafter referred to as Patent Document 2), and Japanese Patent Laid-Open No. 2003-255283 (hereinafter referred to as Patent Document 3).

Patent Document 1 discloses a configuration wherein a 2×2 MMI (Multimode Interference) coupler is applied to a coupling portion of a Mach-Zehnder interferometer which forms a clock modulator in order to reduce the loss while the phases of two outputs of the MMI coupler whose phases are reverse from each other are made the same phase utilizing a difference between the radii of curved and folded back waveguides so as to be connected to a waveguide for data modulation as it is.

Meanwhile, FIG. 9 of Patent Document 2 discloses a configuration wherein two waveguides are formed on a planar optical waveguide circuit substrate made of LN or the like and are disposed near to each other in the proximity of the opposite ends thereof to individually form couplers on the upstream and downstream sides in a light propagation direction such that a delay difference is applied between two paths formed from the waveguides between the couplers utilizing double refraction index variation by an electric field.

Further, Patent Document 3 discloses a technique wherein modulation signals synchronized with each other are supplied individually to two Mach-Zehnder type optical modulators through signal transmission lines having lengths different from each other so that optical signals having a time difference corresponding to the difference between the lengths of the signal transmission lines are generated.

In the Mach-Zehnder type optical modulator, reduction of the amplitude of an electric signal to be applied to an electrode, that is, reduction of a driving voltage, is conventionally considered as a significant subject, and it is demanded to effectively supply an electric field for modulating light.

However, in a case wherein, for example, such a CS-RZ as described above is applied as a modulation method or in a like case, a driving voltage equal to twice $V\pi$ is required. In this instance, a high driving voltage is required in comparison with that in an alternative case wherein a driving voltage equal to $V\pi$ is used by a different driving method. Therefore, it is further demanded to increase the modulation efficiency of light with respect to an electric signal to be applied, that is, to effectively supply an electric field to an optical waveguide.

It is to be noted that the objects and application subjects of the techniques disclosed in Patent Documents 1 to 3 described above are different from those of the present invention. Therefore, even if the techniques described above are merely collected, it is difficult to solve the subject described above.

SUMMARY OF THE INVENTION

It is an object of the present invention to improve the modulation efficiency for a driving voltage.

It is to be noted that, in addition to the object described above, it may be understood as another object of the present invention to achieve such effects as are derived from the constitutions exhibited by the best mode for carrying out the present invention hereinafter described but are not achieved by the conventional techniques.

(1) In order to attain the object described above, according to an aspect of the present invention, there is provided an optical waveguide device comprising a substrate having an electro-optic effect, an optical waveguide formed on the substrate, an electrode section adapted to supply an electric field for carrying out phase modulation synchronized with a clock signal to the optical waveguide, and a Mach-Zehnder interferometer connected to the downstream side of the optical waveguide and including two branching waveguides having optical lengths different from each other.

(2) According to another aspect of the present invention, there is provided an optical waveguide device comprising a substrate having an electro-optic effect, a clock modulation section formed on the substrate and adapted to carry out clock modulation for input light, and a data modulation section adapted to carry out data modulation for the light modulated by the clock modulation section, and wherein the clock modulation section includes a substrate having an electro-optic effect, an optical waveguide formed on the substrate, an electrode section adapted to supply an electric field for carrying out phase modulation synchronized with a clock signal to the optical waveguide, and a Mach-Zehnder interferometer connected to the downstream side of the optical waveguide and including two branching waveguides having an optical length difference therebetween which corresponds to a half wavelength of the clock signal for clock modulation.

With the optical waveguide devices, there is an advantage that, by the optical waveguide, electrode section and Mach-Zehnder interferometer, clock modulation for CS-RZ optical modulation can be implemented while the modulation efficiency for a driving voltage is improved when compared with that of conventional techniques.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2, 3(a) and 3(b) are views illustrating functions of the optical waveguide device according to the first embodiment of the present invention;

DESCRIPTION OF THE PREFERRED EMBODIMENTS

In the following, embodiments of the present invention are described with reference to the drawings.

It is to be noted that the present invention is not restricted to the embodiments described below. Further, not only the objects described above but also other technical subjects, means for solving the technical subjects and operation/working-effects become apparent from the following disclosure of the embodiments of the present invention.

[A] Description of the First Embodiment

Figure 1:
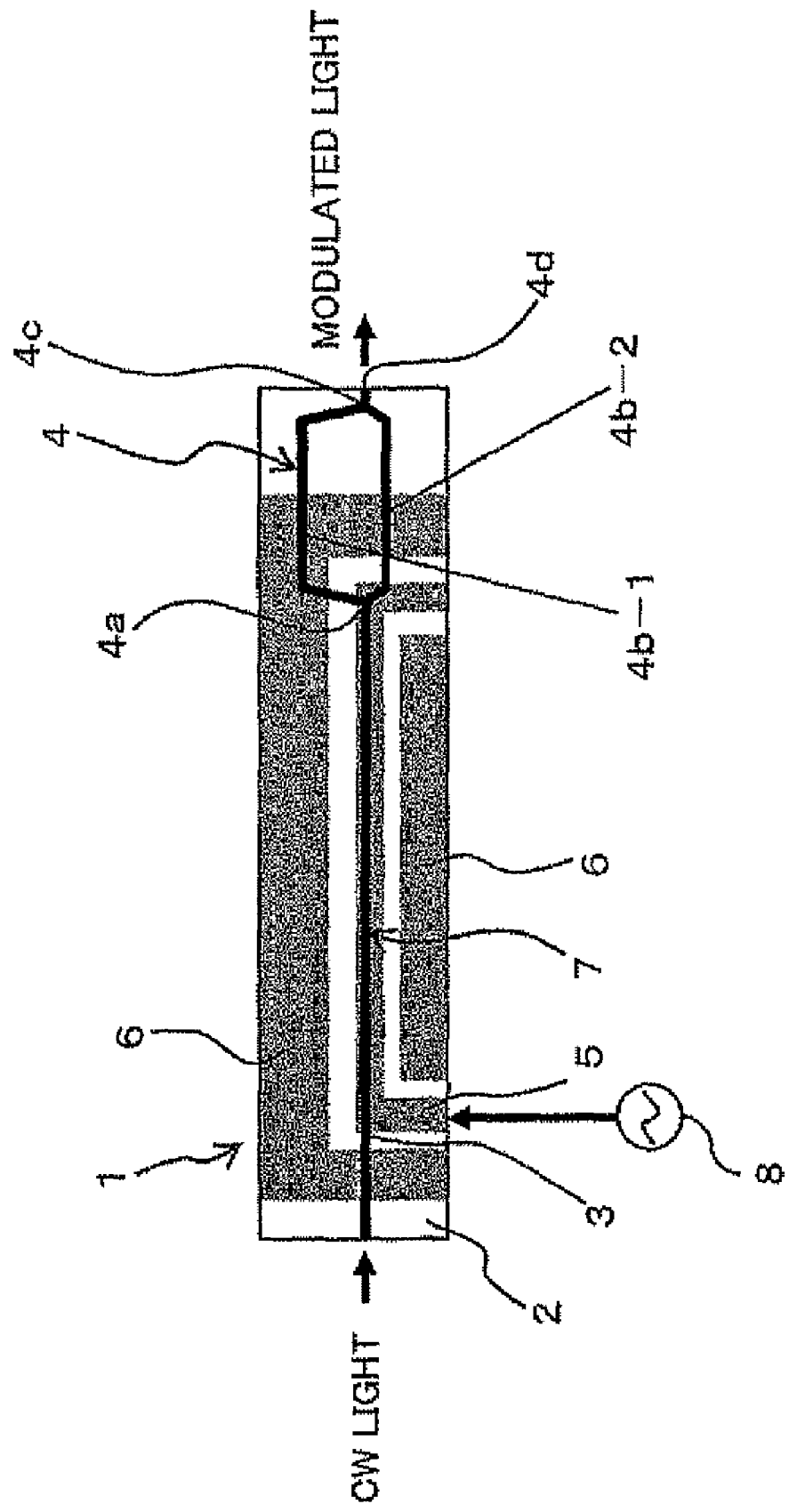
FIG. 1 is a schematic top plan view showing an optical waveguide device according to a first embodiment of the present invention.
Figure 12:
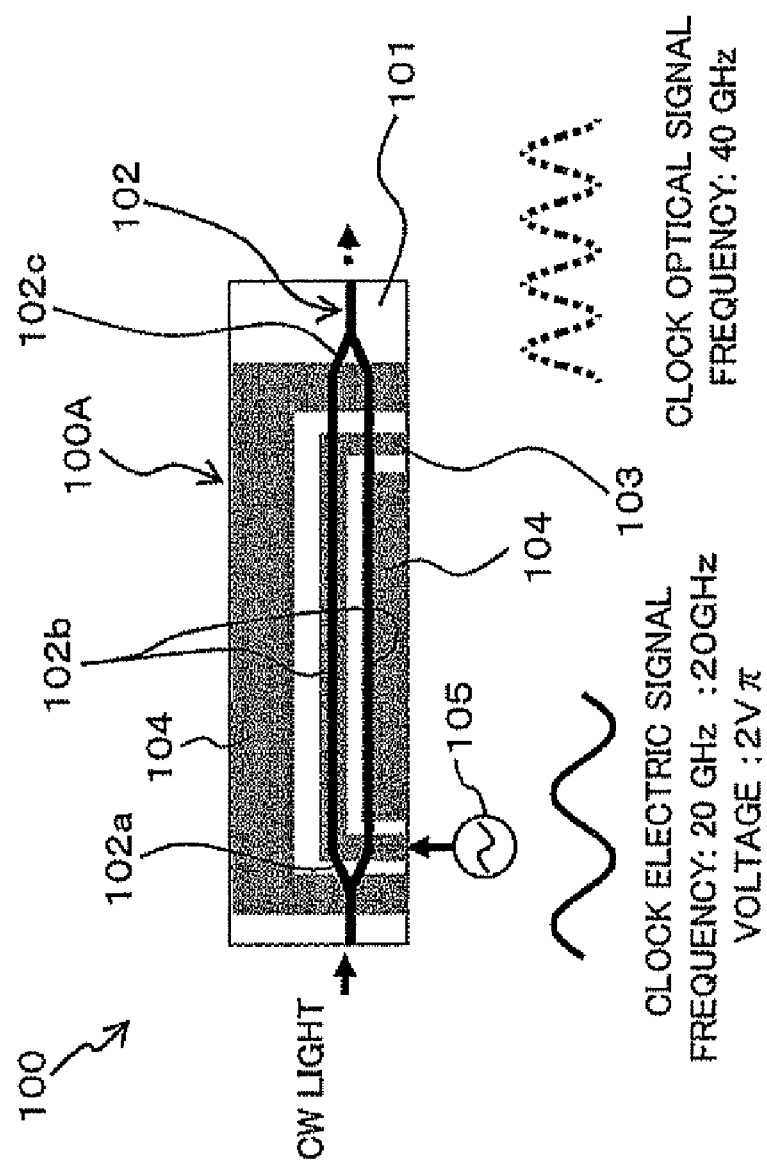
FIGS. 12 to 14 are views illustrating conventional techniques.

FIG. 1 is a schematic top plan view showing an optical waveguide device 1 according to a first embodiment of the present invention. Referring to FIG. 1, the optical waveguide device 1 shown includes a substrate 2 having an electro-optical effect such as Z-cut LN, and an optical waveguide 3 and a Mach-Zehnder interferometer 4 formed on the substrate 2 and connected to the optical waveguide 3. Similarly as in the case of FIG. 12, the optical waveguide 3 and the Mach-Zehnder interferometer 4 are formed on the substrate 2 by Ti diffusion or proton exchange.

Further, a phase modulation electrode 5 for supplying a clock signal is formed on the optical waveguide 3. It is to be noted that ground electrodes 6 are formed in a predetermined spaced relationship around the phase modulation electrode 5. Further, an electric signal having, for example, a frequency of 20 GHz is supplied as a clock signal from a clock signal source 8 to the phase modulation electrode 5. Consequently, the phase modulation electrode 5 and the ground electrodes 6 described above cooperate with each other to apply an electric field in response to amplitude variation of the supplied electric signal to the optical waveguide 3 so as to cause refraction index variation. Then, if CW light is inputted to the optical waveguide 3, then an optical signal subjected to phase modulation in synchronism with the supplied clock electric signal is outputted to the Mach-Zehnder interferometer 4 as seen in (a) of FIG. 2.

Accordingly, an electrode section for supplying an electric field for carrying out phase modulation synchronized with the clock signal to the optical waveguide 3 is configured from the phase modulation electrode 5 and ground electrodes 6 described above. Further, the optical waveguide 3, phase modulation electrode 5 and ground electrodes 6 described above cooperate with each other to configure a phase modulation section 7. It is to be noted that a buffer layer not shown is interposed between the phase modulation electrode 5 and ground electrodes 6 and the substrate 2 in order to prevent leakage of light propagating in the optical waveguide 3 and the Mach-Zehnder interferometer 4 at the following stage.

Further, the Mach-Zehnder interferometer 4 includes two branching waveguides 4b-1 and 4b-2 having lengths different from each other, a branching portion 4a for branching light propagated through the optical waveguide 3 into two lights such that the two lights are connected to the two branching waveguides 4b-1 and 4b-2, a coupling portion 4c for coupling the branching waveguides 4b-1 and 4b-2, and a single-mode waveguide 4d connected to the coupling portion 4c.

Consequently, the optical lengths when light is propagated in the Mach-Zehnder interferometer 4 from the optical waveguide 3 are different between a case wherein the light is propagated through the branching waveguide 4b-1 and another case wherein the light is propagated through the branching waveguide 4b-2. In the first embodiment, the branching waveguides 4b-1 and 4b-2 are configured such that the optical length difference therebetween corresponds to a half-wavelength of the clock signal to be applied to the phase modulation electrode 5 described above.

In the first embodiment, the optical length difference described above is provided by setting a length difference between the waveguide lengths of the branching waveguides 4b-1 and 4b-2. It is to be noted that, in FIG. 1, the optical length of the branching waveguide 4b-1 is set longer than that of the branching waveguide 4b-2 by the half-wavelength of the clock signal described above. Accordingly, the optical length in a case wherein light propagates in the Mach-Zehnder interferometer 4 through the branching waveguide 4b-1 is longer by more than the half-wavelength of the clock signal described above than the optical length in another case wherein light propagates in the Mach-Zehnder interferometer 4 through the branching waveguide 4b-2.

Figure 2:
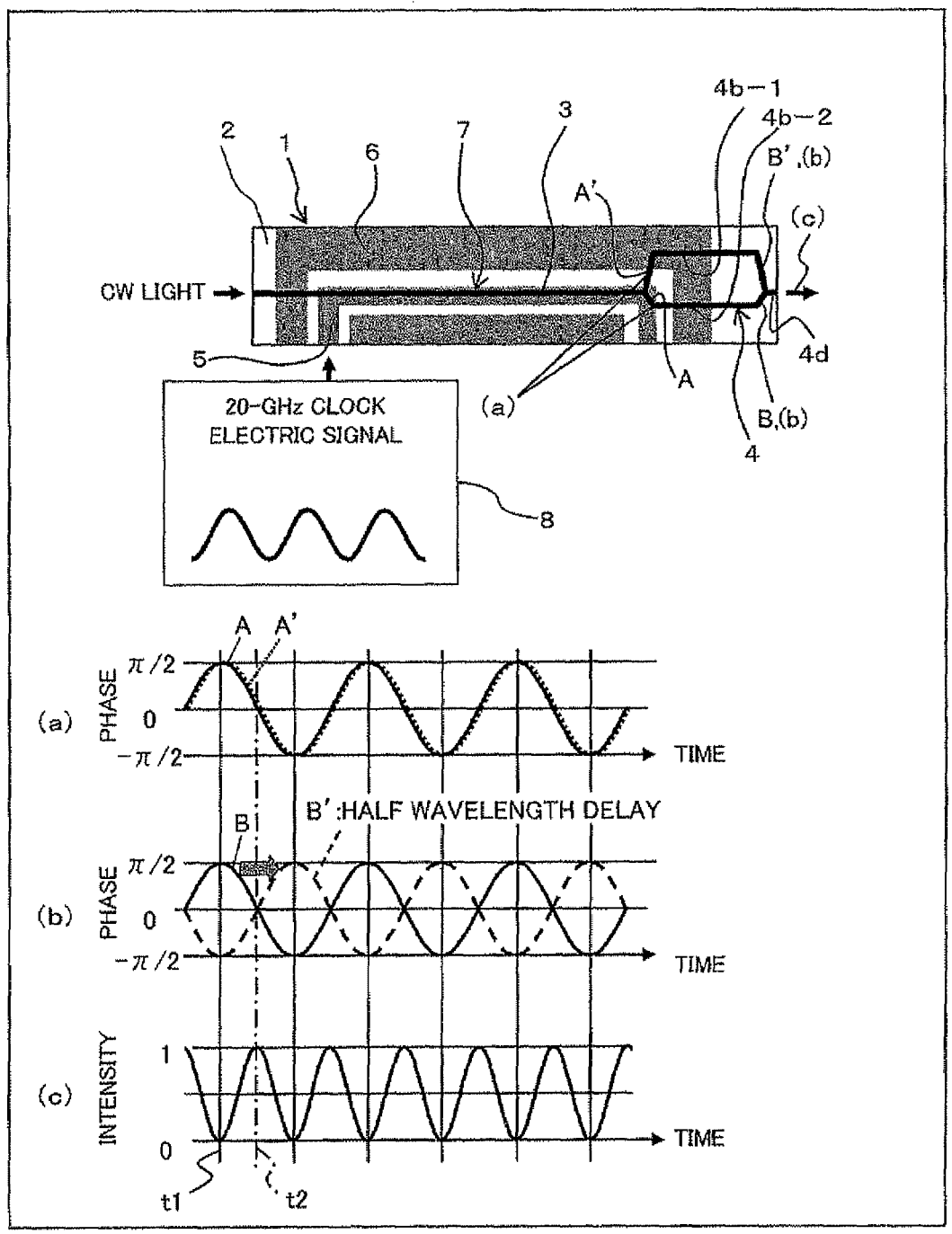

In the optical waveguide device 1 according to the first embodiment configured in such a manner as described above, CW light inputted to the optical waveguide 3 is phase-modulated in synchronism with the clock signal by the optical waveguide 3 which forms the phase modulation section as seen in (a) of FIG. 2. Then, if the optical signal phase-modulated in such a manner as just described is inputted to the Mach-Zehnder interferometer 4, then the optical signal is branched into an optical signal A' to be propagated in the branching waveguide 4b-1 and an optical signal A to be propagated in the branching waveguide 4b-2 by the branching portion 4a.

Then, since the branching waveguides 4b-1 and 4b-2 have such a waveguide length difference as described above, as shown in B', B of (b) of FIG. 2, a delay difference is provided between the optical signals propagated through the branching waveguides 4b-1 and 4b-2 such that the optical signals are displaced from each other by one half-wavelength of a clock frequency at a point of time at which they are coupled by the coupling portion 4c. Here, the difference in modulation phase between the two optical signals B' and B at the point of time at which they are coupled to each other at the coupling portion 4c varies within a range from 0 to $\pi$. Then, when the difference in modulation phase is [0] and [$\pi$], the amplitude of output light coupled by the coupling portion 4c and propagating in the single-mode waveguide 4d is [1] and [0], respectively.

For example, at a point t1 of time in FIG. 2, the difference in modulation phase between the two optical signals B' and B is [$\pi$] as seen in (b), and the intensity of the light coupled at the coupling portion 4c and propagating in the single-mode waveguide 4d is [0] as seen in (c). In particular, since the optical signals B' and B having phases reversed from each other as seen in FIG. 3(b) are emitted to the single-mode waveguide 4d without optically being coupled to each other, the light intensity is [0].

On the other hand, for example, at another point t2 of time in FIG. 2, the difference in modulation phase between the two optical signals B' and B is [0] as seen in (b) of FIG. 2, and the intensity of the light coupled at the coupling portion 4c and propagating in the single-mode waveguide 4d is [1] as seen in (c). In particular, since the optical signals B' and B having the phases reversed from each other are optically coupled in the single-mode waveguide 4d as seen in FIG. 3(a), the light intensity is [1].

In this manner, where the electric signal having a frequency of 20 Hz is inputted to the phase modulation electrode 5, light whose light intensity is switched on and off in a cycle equal to twice one cycle of phase modulation, that is, an optical signal (clock modulation light) having a frequency of 40 GHz, is outputted as output light from the Mach-Zehnder interferometer 4.

Figure 13:
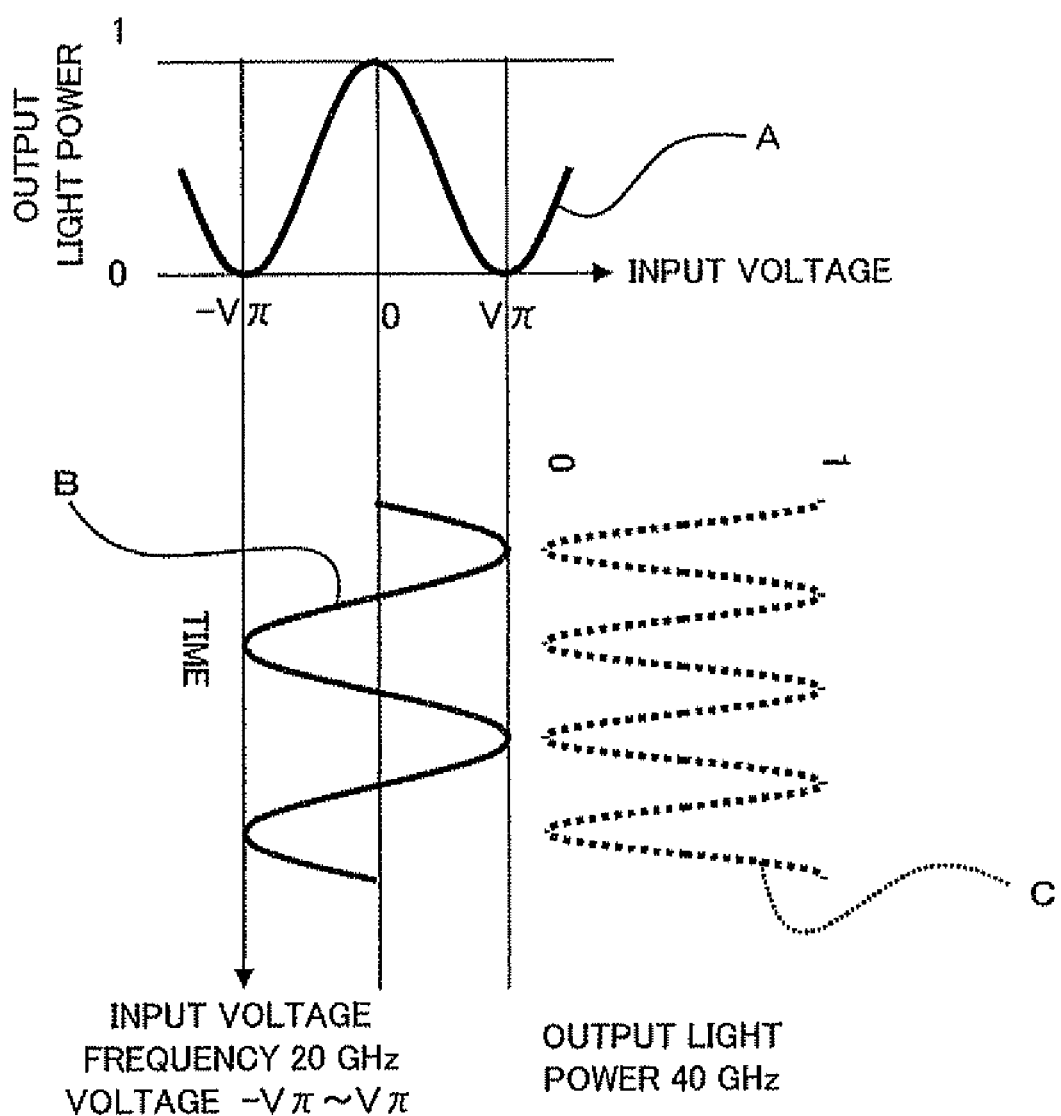

At this time, since it is only necessary for the phase modulation section 7 to be capable of supplying an electric signal having a frequency of 20 GHz to the phase modulation electrode 5 so that the light phase modulation can be carried out in the modulation cycle of 20 GHz, a range corresponding to V π described hereinabove with reference to FIG. 13 is sufficient as the voltage amplitude range. Therefore, the driving voltage can be reduced in comparison with the conventional technique wherein a driving voltage having an amplitude of 2 V π is required. Accordingly, clock modulation for CS-RZ optical modulation can be implemented while the driving voltage V π which has a frequency equal to one half the frequency (40 GHz) to be obtained as that of the clock optical signal and is reduced from that in the conventional technique is exercised.

In this manner, with the first embodiment of the present invention, there is an advantage that, by the optical waveguide 3, phase modulation electrode 5 and ground electrodes 6 which form the electrode section and Mach-Zehnder interferometer 4, clock modulation for CS-RZ optical modulation can be implemented while the modulation efficiency for the driving voltage is improved in comparison with that by the conventional technique.

[A1] Description of a Modification to the First Embodiment

Figure 4:
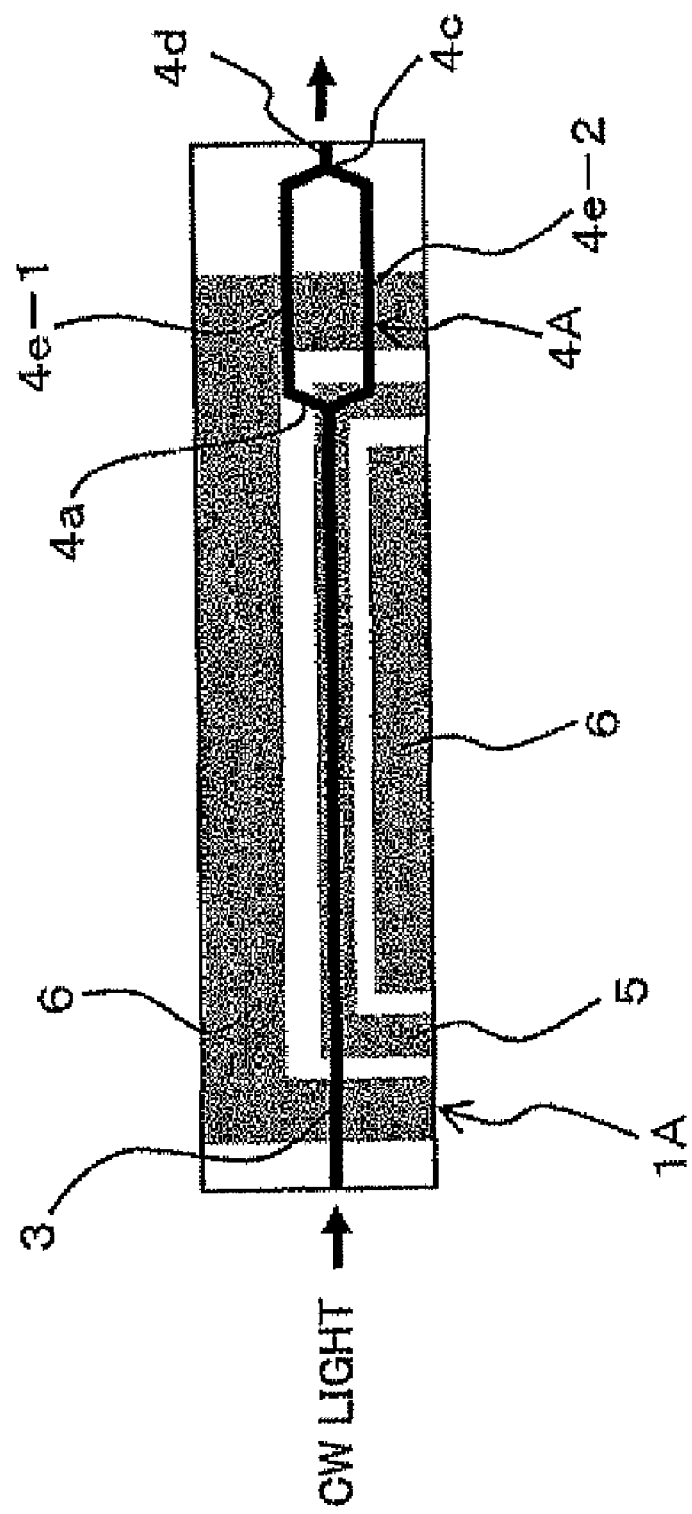
FIG. 4 is a view showing an optical waveguide device according to a modification to the first embodiment of the present invention.

FIG. 4 is a view showing an optical waveguide device 1A according to a modification to the first embodiment of the present invention. In the optical waveguide device 1A seen in FIG. 4, while the manner wherein an optical length difference is produced between two branching waveguides 4e-1 and 4e-2 which form a Mach-Zehnder interferometer 4A is different from that of the optical waveguide device 1 described hereinabove with reference to FIG. 1, the configuration of the other part is basically similar to that of the optical waveguide device 1. It is to be noted that, in FIG. 4, like elements to those in FIG. 1 are denoted by like reference characters.

Here, in the Mach-Zehnder interferometer 4A seen in FIG. 4, different from the Mach-Zehnder interferometer 4 of FIG. 1, an optical length difference is provided not by the physical waveguide length difference between the two branching waveguides 4e-1 and 4e-2 but by a refraction index difference.

In particular, the two branching waveguides 4e-1 and 4e-2 are configured so as to have a refraction index difference capable of providing an optical length difference similar to that described hereinabove with reference to FIG. 1. More particularly, the refraction index of the branching waveguide 4e-1 is set higher than that of the branching waveguide 4e-2 such that the length of light propagation in the branching waveguide 4e-1 becomes longer than that of light propagation in the branching waveguide 4e-2 by an optical length corresponding to one half-wavelength of the clock electric signal.

In other words, while the physical lengths of the branching waveguides 4e-1 and 4e-2 seen in FIG. 4 are equal to each other, a difference is provided between the refraction indexes of the branching waveguides so that light propagation time in the branching waveguide 4e-1 is delayed from that on the branching waveguide 4e-2 by a period of time corresponding to one half-cycle time of the clock electric signal.

The Mach-Zehnder interferometer 4A configured in such a manner as described above can implement a function same as that of the Mach-Zehnder interferometer 4 of the first embodiment described above.

It is to be noted that the refraction index difference between the two branching waveguides may be produced in a different manner. For example, the refraction index of the branching waveguide 4e-1 may be set lower than that of the branching waveguide 4e-2 so that light propagation time in the branching waveguide 4e-2 is delayed from that in the branching waveguide 4e-1 by a period of time (half-cycle time) corresponding to one half-wavelength of the clock electric signal.

[B] Description of the Second Embodiment

Figure 5:
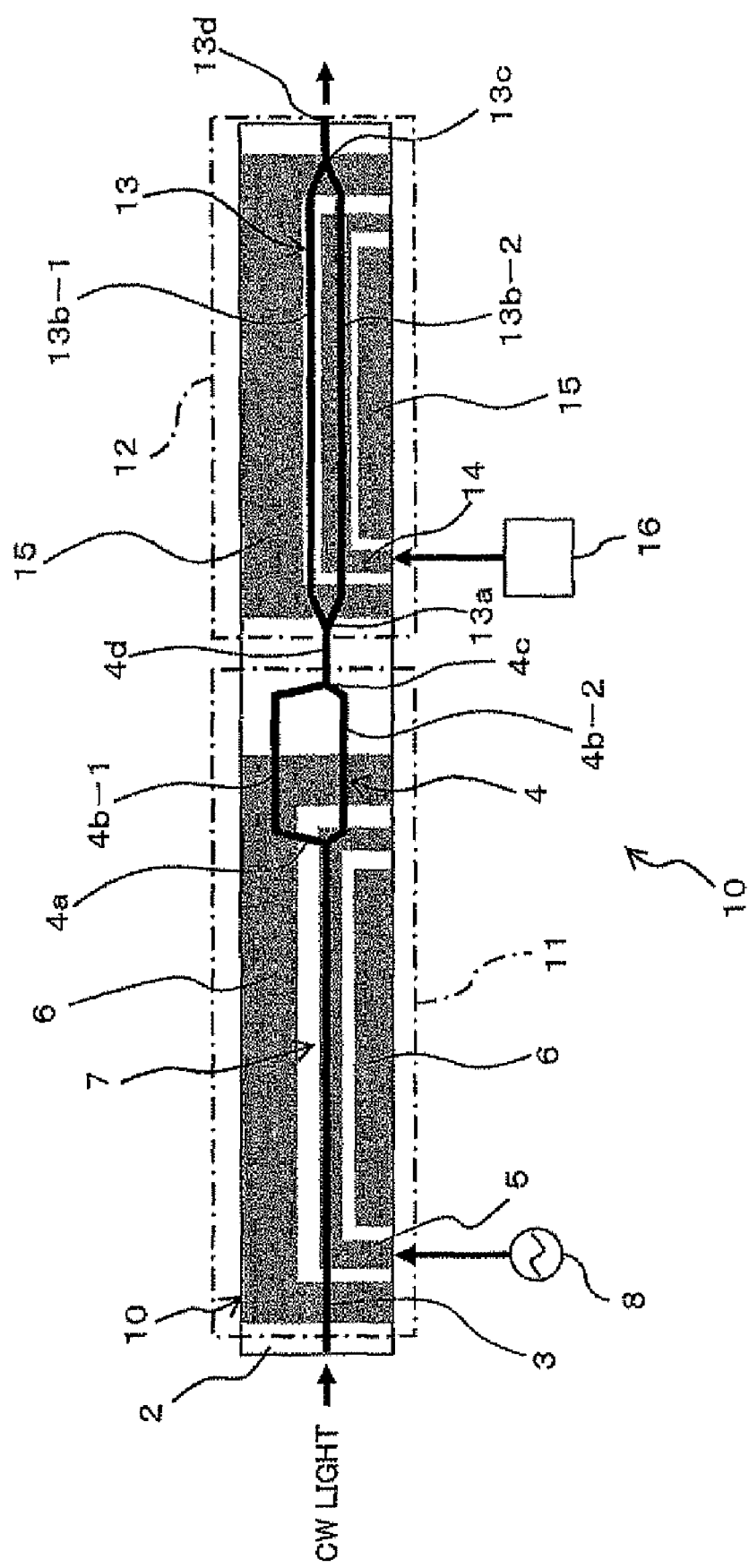
FIG. 5 is a schematic top plan view showing an optical waveguide device according to a second embodiment of the present invention.

FIG. 5 is a schematic top plan view showing an optical waveguide device 10 according to a second embodiment of the present invention. In the optical waveguide device 10 shown in FIG. 5, a clock modulation section 11 is provided as a configuration which forms the optical waveguide device 1 according to the first embodiment described above, and a configuration as a data modulation section 12 is integrally formed on the same substrate 2. It is to be noted that, in FIG. 5, like elements to those in FIG. 1 are denoted by like reference characters.

In particular, as the clock modulation section 11, an optical waveguide 3, a phase modulation electrode 5 and ground electrodes 6 which form a phase modulation section 7 are provided on the substrate 2, and a Mach-Zehnder interferometer 4 connected to the optical waveguide 3 is formed on the downstream side in a light propagation direction with respect to the optical waveguide 3.

The data modulation section 12 carries out data modulation (NRZ data modulation) for light modulated by the clock modulation section 11 and includes a configuration similar to that of the data modulation section (refer to reference numeral 112) described herein above with reference to FIG. 14. In particular, the data modulation section 12 includes a Mach-Zehnder interferometer 13 connected to a single-mode waveguide 4d which forms the Mach-Zehnder interferometer 4, a signal electrode 14 formed on one of two branching waveguides 13b-1 and 13b-2 which form the Mach-Zehnder interferometer 13 (in this instance, formed on the branching waveguide 13b-2), and ground electrodes 15 formed in a predetermined spaced relationship around the signal electrode 14.

Figure 14:
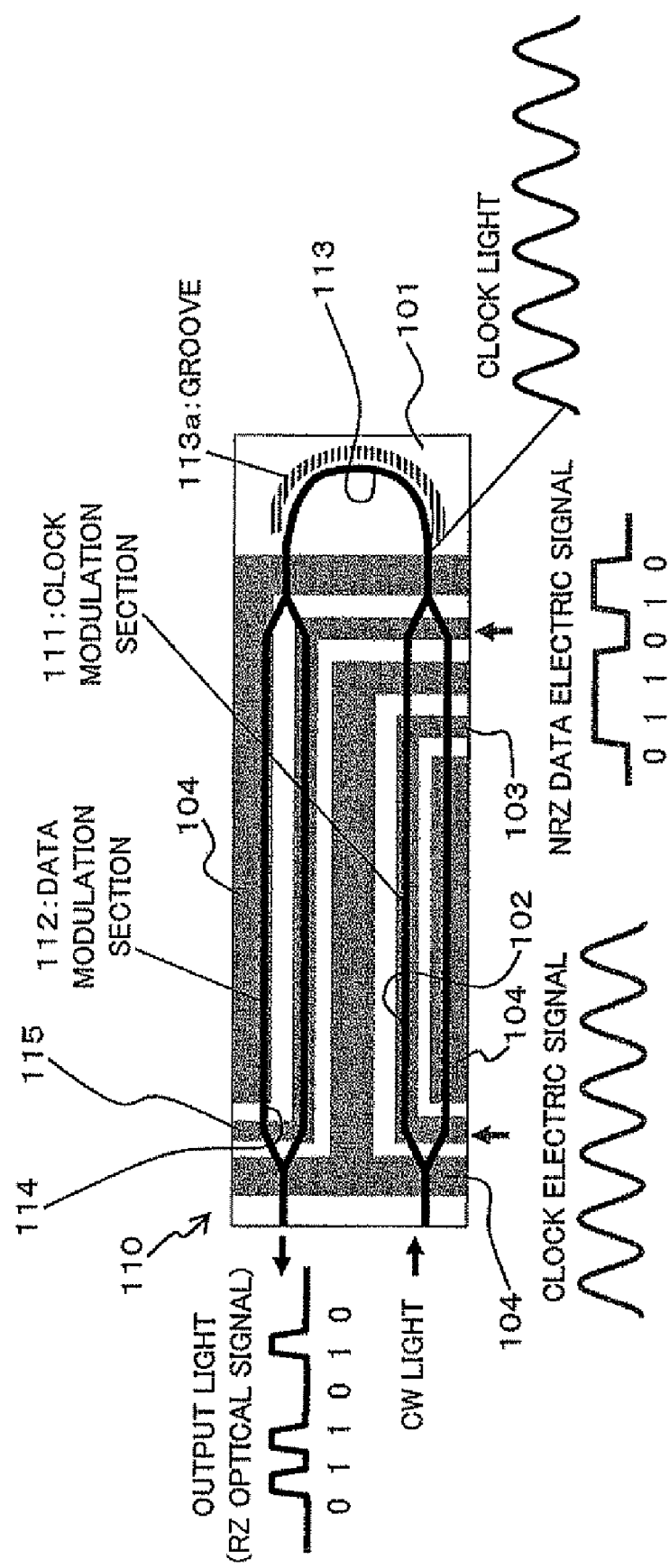

To the signal electrode 14, an NRZ data electric signal of 40 Gb/s described hereinabove with reference to FIG. 14 is supplied from an NRZ data electric signal source 16 to the branching wave guide 13b-2. Consequently, the signal electrode 14 to which the electric signal is supplied and the ground electrodes 15 cooperate to apply an electric field based on the NRZ data electric signal to the branching waveguides 13b-1 and 13b-2. Thus, if an RZ clock optical signal of 40 GHz is inputted from the clock modulation section 11 to the Mach-Zehnder interferometer 13, then an optical signal RZ-data-modulated with 40 Gb/s can be outputted from the data modulation section 12.

It is to be noted that, while also the Mach-Zehnder interferometer 13 includes a branching portion 13a connected to the single-mode waveguide 4d, two branching waveguides 13b-1 and 13b-2, a coupling portion 13c for coupling the two branching waveguides 13b-1 and 13b-2, and a single-mode waveguide 13d for propagating light after coupled at the coupling portion 13c therein, the optical lengths of optical paths through the branching waveguides 13b-1 and 13b-2 can be set substantially equal to each other.

Also with the optical waveguide device 10 according to the second embodiment configured in such a manner as described above, there is an advantage that, since the clock modulation section 11 similar to the configuration which forms the optical waveguide device 1 in the first embodiment is provided, similarly as in the case of the first embodiment described above, clock modulation for CS-RZ optical modulation can be implemented while the modulation efficiency for the driving voltage is improved from that of the conventional technique.

It is to be noted that, while, in the second embodiment described above, if CW light is inputted from an end of the substrate 2, then an RZ optical signal which is a result of modulation is extracted from an end on the opposite side of the substrate 2, according to the present invention, the configuration for extraction is not limited to this. For example, the single-mode waveguide 4 may be configured as a curved and folded back waveguide similar to that described hereinabove with reference to FIG. 14 such that incoming light and outgoing light are inputted to and extracted from the same face. By the configuration just described, effective utilization of a wafer to be used as a material of the substrate 2 can be promoted and reduction of the device size can be implemented.

[C] Description of the Third Embodiment

Figure 6:
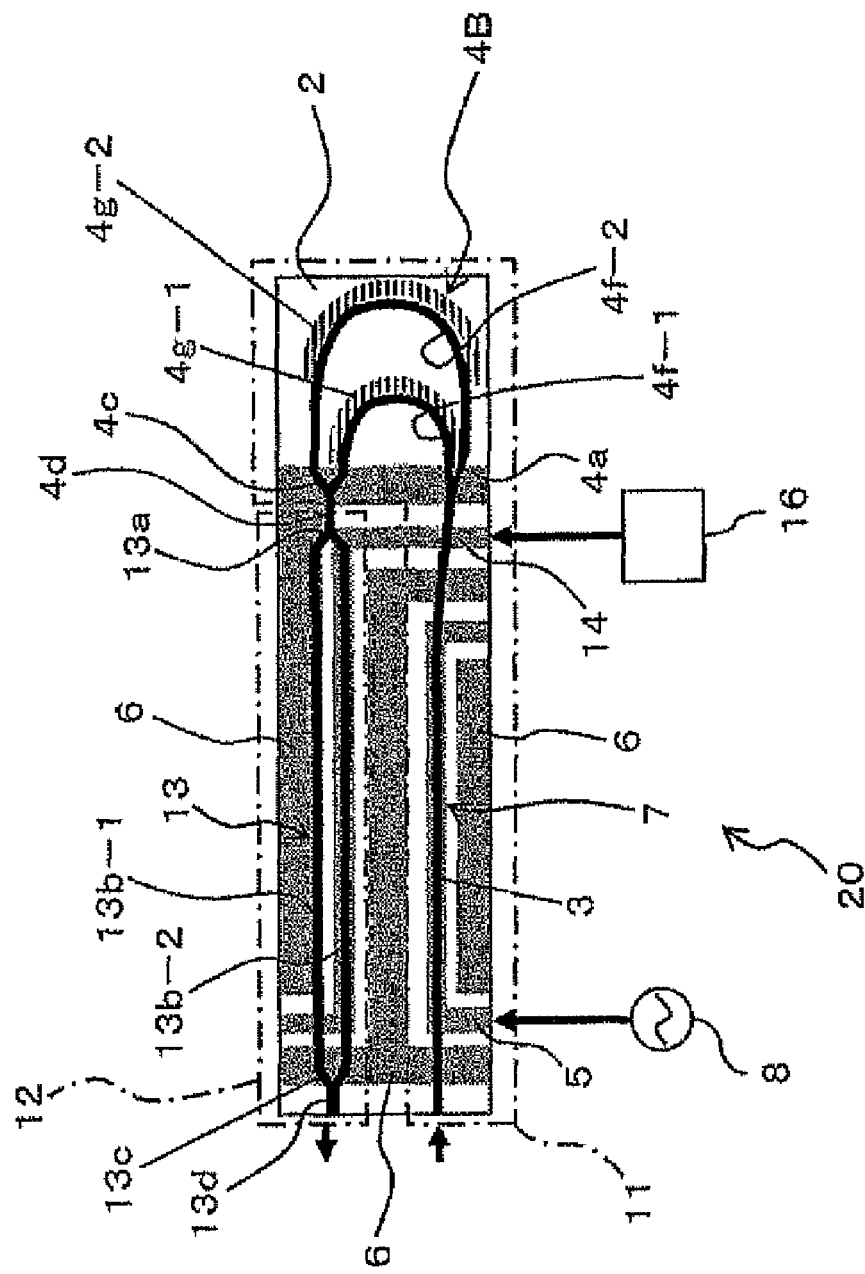
FIG. 6 is a schematic top plan view showing an optical waveguide device according to a third embodiment of the present invention.

FIG. 6 is a schematic top plan view showing an optical waveguide device 20 according to a third embodiment of the present invention. While, also with the optical waveguide device 20 shown in FIG. 6, reduction of the device size can be implemented through a region of curved and folded back waveguides, particularly the curved and folded back waveguide region is provided on a Mach-Zehnder interferometer 4B. It is to be noted that, in FIG. 6, like elements to those in FIG. 5 are denoted by substantially like reference characters.

In particular, as seen in FIG. 6, the Mach-Zehnder interferometer 4B includes two branching waveguides 4*f*-1 and 4*f*-2 curved and folded back in a semi-circular shape and having lengths different from each other, a branching portion 4*a* for branching light propagated through the optical waveguide 3 which forms the phase modulation section 7 into two lights and connecting the two lights to the branching waveguides 4*f*-1 and 4*f*-2, a coupling portion 4*c* for coupling the branching waveguides 4*f*-1 and 4*f*-2, and a single-mode waveguide 4*d* connected to the coupling portion 4*c*.

The branching waveguides 4*f*-1 and 4*f*-2 are both curved and folded back in a left side direction with respect to the light propagation direction, and the branching waveguide 4*f*-1 forms an inside path in the curved direction while the branching waveguide 4*f*-2 forms an outside path in the curved direction. In particular, while both of the branching waveguides 4*f*-1 and 4*f*-2 connect the branching portion 4*a* and the coupling portion 4*c* to each other, the waveguide length of the branching waveguide 4*f*-1 which forms the inside path in the curved direction can be easily formed shorter than that of the branching waveguide 4*f*-2 which forms the outside path in the curved direction.

At this time, a difference in length is set between the waveguide lengths of the branching waveguides 4*f*-1 and 4*f*-2 such that the optical length (that is, waveguide length) of the branching waveguide 4*f*-2 is formed longer than the optical length (waveguide length) of the branching waveguide 4*f*-1 by one half-wavelength of the clock signal described above similarly as in the case of the first embodiment described above (refer to reference characters 4*b-l* and 4*b*-2) In other words, the two branching waveguides 4*f*-1 and 4*f*-2 described above are formed as waveguides curved and folded back in one direction, and the branching waveguide 4*f*-2 curved and folded back from between the two branching waveguides 4*f*-1 and 4*f*-2 is formed as a branching waveguide having the optical length longer than that of the inside branching waveguide 4*f*-1 curved and folded back.

It is to be noted that reference characters 4*g*-1 and 4*g*-2 represent grooves individually formed on the outer periphery side of the branching waveguides 4*f*-1 and 4*f*-2, respectively, and the confining effect of light propagating in the branching waveguides 4*f*-1 and 4*f*-2 is promoted by the grooves 4*g*-1 and 4*g*-2.

Also with the optical waveguide device 20 according to the third embodiment configured in such a manner as described above, there is an advantage that, since the clock modulation section 11 similar to the configuration which forms the optical waveguide device 1 in the first and second embodiments is provided, similarly as in the case of the first embodiment described hereinabove, clock modulation for CS-RZ optical modulation can be implemented while the modulation efficiency for the driving voltage is improved from that of the conventional technique.

Further, by the Mach-Zehnder interferometer 4B including the curved and folded back branching waveguides 4*f*-1 and 4*f*-2, reduction of the device size can be achieved through a region of the curved and folded back waveguides and the waveguide length of the branching waveguide 4*f-l* which forms the inside path in the curved direction can be easily formed shorter than that of the branching waveguide 4*f*-2 which forms the outside path in the curved direction. Therefore, enhancement of the efficiency of waveguide layout for setting of an optical length difference necessary for the Mach-Zehnder interferometer 4B can be promoted.

[C1] Description of Modifications to the Third Embodiment

Figure 7:
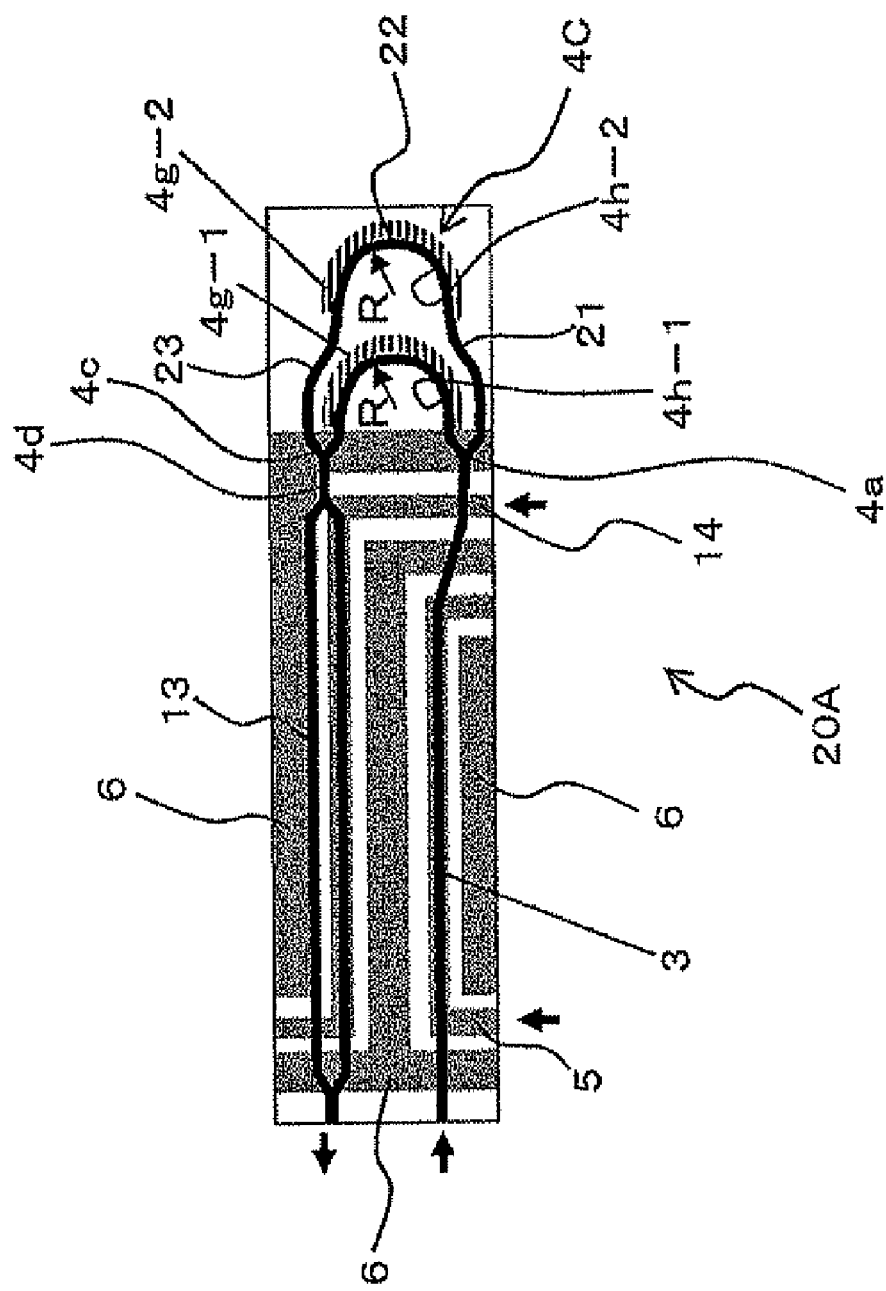
FIG. 7 is a view showing the optical waveguide device according to a first modification to the third embodiment of the present invention.

FIG. 7 is a view showing an optical waveguide device 20A according to a first modification to the third embodiment of the present invention. While the optical waveguide device 20A seen in FIG. 7 is different from the optical waveguide device 20 described hereinabove with reference to FIG. 6 in that the shapes of two branching waveguides 4*h*-1 and 4*h*-2 which form a Mach-Zehnder interferometer 4C are different from those of the Mach-Zehnder interferometer 4B of FIG. 6, the configuration of the other part is basically similar to that of the optical waveguide device 20. It is to be noted that, in FIG. 7, like elements to those in FIG. 6 are denoted by substantially like reference characters.

In particular, also in the branching waveguides 4*h*-1 and 4*h*-2 in the optical waveguide device 20A shown in FIG. 7, a waveguide length difference is set by a curved and folded inside path and a curved and folded outside path similarly as in the case in FIG. 6 and the optical length (that is, waveguide length) of the branching waveguide 4*h*-2 is formed longer than the optical length (waveguide length) of the branching waveguide 4*h*-1 by one half-wavelength of the clock signal described above.

Further, the outside curved and folded back branching waveguide 4*h*-2 includes S-shaped waveguides 21 and 23 provided on the upstream and downstream sides with respect to the light propagation direction thereof, respectively, and a curved waveguide 22 which connects the S-shaped waveguides 21 and 23 on the upstream and downstream sides to each other and whose curved radius R is substantially equal to that of the inside curved and folded back branching waveguide 4*h*-1.

It is to be noted that the S-shaped waveguides 21 and 23 have a shape with which reduction of the loss can be achieved in comparison with the curved waveguide 22. Then, since the curved waveguide 22 has a curve radius substantially equal to a radium R of curvature (curve radius) which the branching waveguide 4*h*-1 has, equalization in loss between the two branching waveguides 4*h*-1 and 4*h*-2 is achieved.

Consequently, the optical waveguide device 20A shown in FIG. 7 not only exhibits an advantage similar to that of the optical waveguide device described hereinabove with reference to FIG. 6 but also exhibits another advantage that the radii of curvature of the branching waveguides 4h-1 and 4h-2 are equalized to each other to equalize the loss so that degradation of the extinction ratio can be suppressed.

Figure 8:
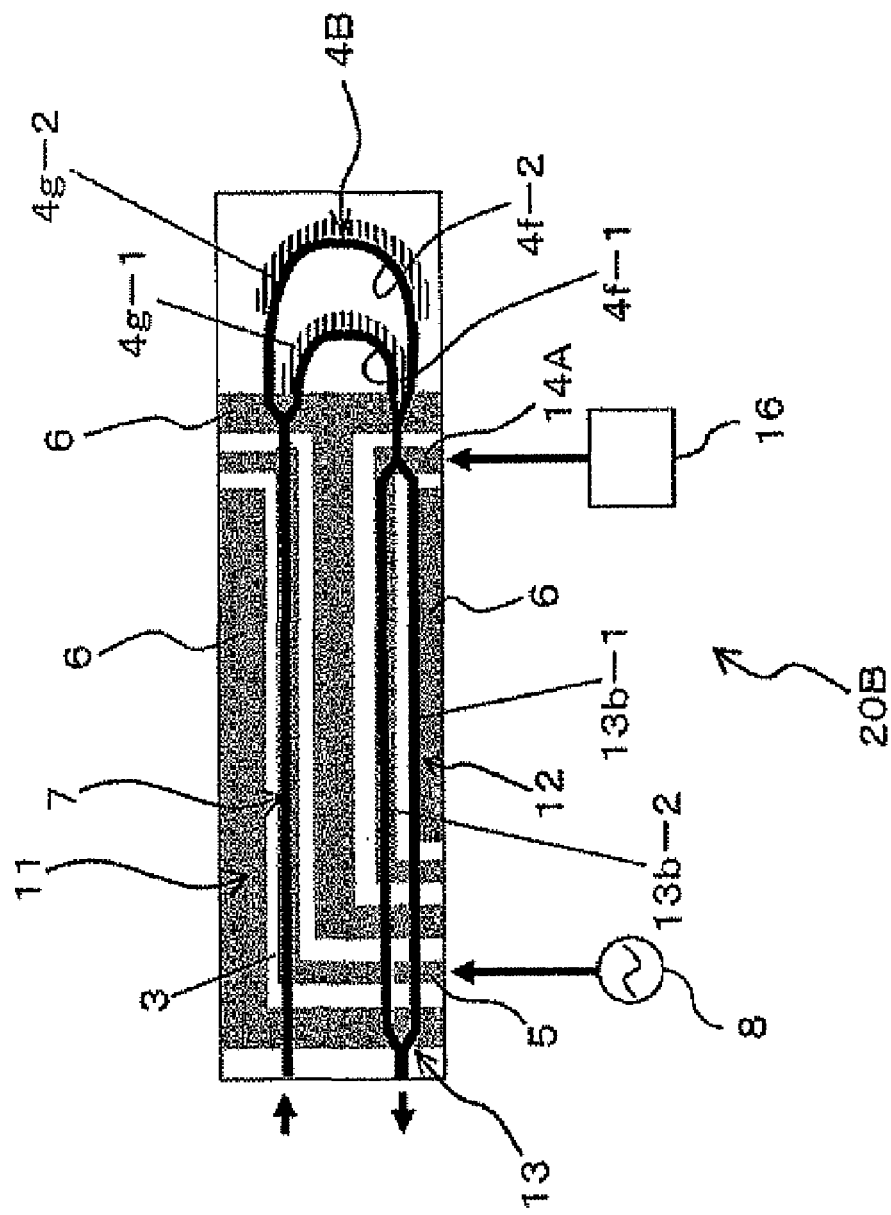
FIG. 8 is a view showing the optical waveguide device according to a second modification to the third embodiment of the present invention.

FIG. 8 is a view showing an optical waveguide device 20B according to a second modification to the third embodiment of the present invention. Referring to FIG. 8, in the optical waveguide device 20B shown, different from the optical waveguide device 20 shown in FIG. 6, an electrode having a configuration wherein the feed is shortened is formed as a signal electrode 14A which forms the data modulation section 12.

From a view point of promotion in enhancement of efficiency of packaging of the device, it is required to dispose input pads which form the data modulation section 12 and the clock modulation section 11 on the same side face side of the substrate 2. Therefore, an input pad for connecting an electric wiring line from the NRZ data electric signal source 16 to the signal electrode 14A and another input pad for connecting an electric wiring line from the clock signal source 8 to the phase modulation electrode 5 are provided on the same side face side of the substrate 2.

In the optical waveguide device 20B shown in FIG. 8, different from the optical waveguide device 20 shown in FIG. 6, the feed of the electrode pattern from the input pad of the signal electrode 14A to the branching waveguide 13b-2 which forms the Mach-Zehnder interferometer 13 is shorter than the feed of the electrode pattern from the input pad of the phase modulation electrode 5 to the optical waveguide 3. Therefore, degradation of a frequency band in the modulation section 12 can be suppressed.

In particular, similarly as in the second and third embodiments, where the phase modulation section 7 carries out phase modulation with a clock signal of 20 GHz from the clock signal source 8 and the data modulation section 12 carries out modulation with an NRZ data electric signal of 40 Gb/s from the NRZ data electric signal source 16, a relatively broad modulation band is required for the modulation band in the data modulation section 12 rather than for the modulation band in the phase modulation section 7. Therefore, the feed of the signal electrode 14A is formed shorter attaching greater importance to suppression of band degradation in the data modulation section 12 than to suppression of band degradation in the phase modulation section 7 so that enhancement of the modulation performance can be achieved.

[D] Description of the Fourth Embodiment

FIG. 8 is a view showing an optical waveguide device 30 according to a fourth embodiment of the present invention. Referring to FIG. 8, the optical waveguide device 30 shown includes a two-input two-output (2×2) MMI coupler 4i as a coupling portion 4i for coupling branching waveguides 4f-1 and 4f-2 in addition to the configuration of the optical waveguide device (refer to reference numeral 20 in FIG. 6) in the second embodiment described above. Further, the optical waveguide device 30 includes a configuration for applying a controlling electric field to the two branching waveguides 4f-1 and 4f-2 which form the Mach-Zehnder interferometer 4B so that the phase relationship at a point of time at which lights propagated through the branching waveguides 4f-1 and 4f-2 are coupled by the MMI coupler 4i is adjusted.

Figure 9:
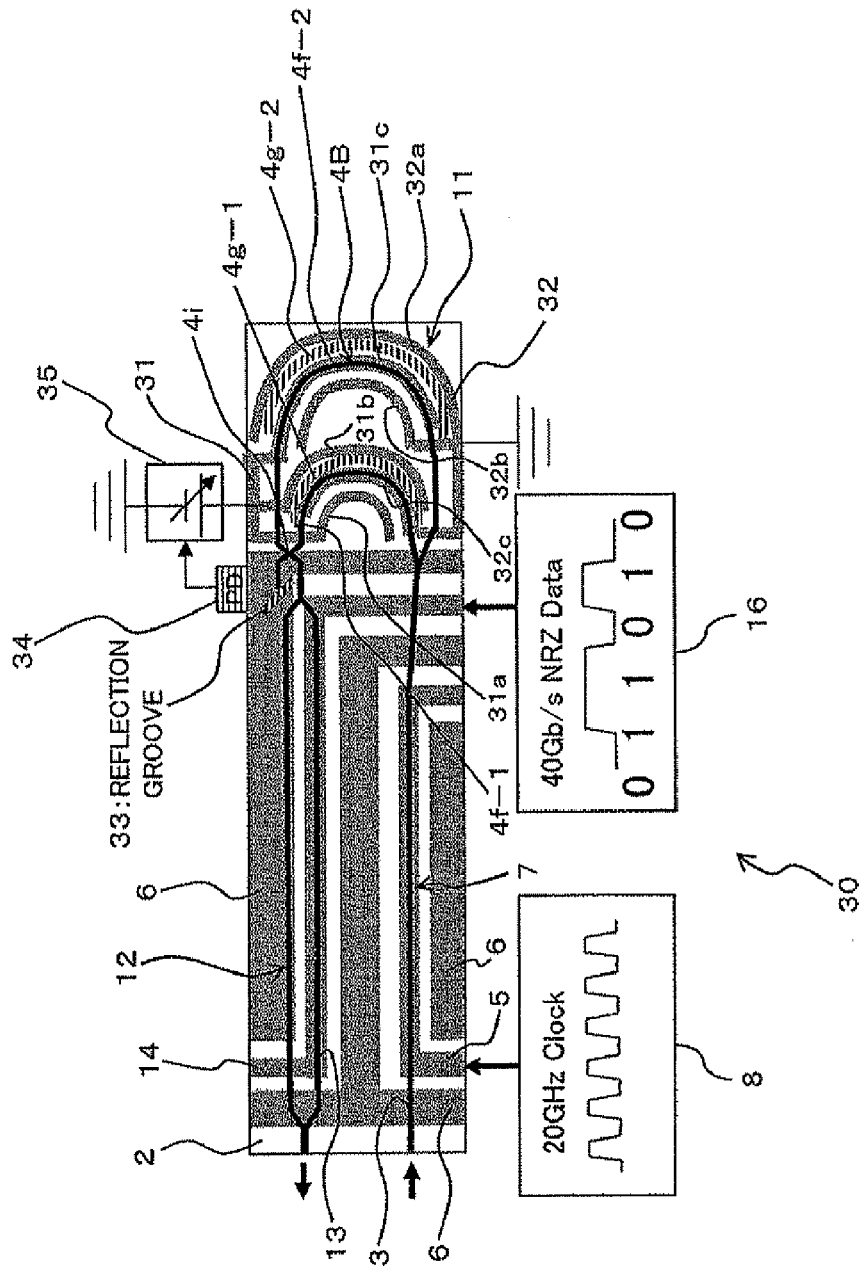
FIG. 9 is a view showing an optical waveguide device according to a fourth embodiment of the present invention.

It is to be noted that, in FIG. 9, like elements to those in FIG. 6 are denoted by substantially like reference characters.

Here, while a relative optical length difference by one half-cycle of the clock signal is provided by the branching waveguides 4f-1 and 4f-2, it is also necessary to adjust, in order to allow an RZ clock signal to subsequently propagate in the single-mode waveguide 4d, the phase relationship between lights propagating in the branching waveguides 4f-1 and 4f-2 such that the phases of the lights at a point of time at which they are coupled to each other at the coupling portion 4i match with each other.

To that end as described above, in the optical waveguide device 30 according to the fourth embodiment, light outputted from the coupling portion 4i is monitored and biasing electric fields are applied individually to the branching waveguides 4f-1 and 4f-2 based on a result of the monitoring so that a matched phase relationship between the lights propagated through the branching waveguides 4f-1 and 4f-2 may be established at a point of time at which the lights are coupled to each other at the coupling portion 4i.

Here, reference numeral 31 indicates a comb-tooth electrode including three tooth electrode portions 31a to 31c each having a semicircular portion and reference numeral 32 indicates a comb-tooth electrode including three tooth electrode portions 32a to 32c each having a similar semicircular portion. The tooth electrode portions 31a to 31c and 32a to 32c are disposed in alternate meshing engagement with each other. A control electrode is formed from the comb-tooth electrodes 31 and 32.

Further, the tooth electrode portion 32c which forms the comb-tooth electrode 32 is formed so as to extend above and along the branching waveguide 4f-1, and the tooth electrode portions 31a and 31b which form the comb-tooth electrode 31 are formed so as to sandwich the tooth electrode portion 32c described above. Similarly, the tooth electrode portion 31c which forms the comb-tooth electrode 31 is formed so as to extend above and along the branching waveguide 4f-2, and the tooth electrode portions 32a and 32b which form the comb-tooth electrode 32 are formed so as to sandwich the tooth electrode portion 31c described above.

Further, a control section 35 applies such a bias electric field as described above to the comb-tooth electrodes 31 and 32 based on a result of the monitoring of light outputted from the coupling portion 4i. Here, while the comb-tooth electrode 31 is connected to the control section 35, since the comb-tooth electrode 32 is grounded, an electric field is generated between the comb-tooth electrode 31 and the comb-tooth electrode 32 disposed in the proximity of the electrode 31. In other words, electric fields whose signs are different from each other but whose magnitudes are substantially equal to each other are applied individually to the branching waveguides 4f-1 and 4f-2 wherein the comb-tooth electrode portions 32c and 31c to which potentials different from each other are applied are formed thereabove.

Accordingly, the three tooth electrode portions 31a to 31c which configure the comb-tooth electrode 31 function as three first voltage application electrodes, and the three tooth electrode portions 32a to 32c which configure the comb-tooth electrode 32 function as three second voltage application electrodes configured so as to be disposed alternately with the tooth electrode portions 31a to 31c. Then, by the disposition of the tooth electrode portions 31a to 31c and 32a to 32c, the electric fields having directions reversed from each other are applied to the two branching waveguides 4f-1 and 4f-2.

Further, since, in the optical waveguide device 30 according to the fourth embodiment, part of light outputted from the coupling portion 4i is fetched as monitor light with low loss, the coupling portion 4i is configured as the two-input two-output MMI coupler 4i. Then, one of the two outputs of the MMI coupler 4i is connected to the Mach-Zehnder interferometer 13 which forms the data modulation section 12 and the other one of the two outputs of the MMI coupler 4i is used for monitoring.

Reference numeral 33 indicates a reflection groove formed above the other one of the output paths of the MMI coupler 4i, and light reflected by the reflection groove 33 is inputted to a monitoring photodiode (light reception device) 34 provided on the side face side of the substrate 2. Consequently, the other output of the MMI coupler 4i is optically connected to (the light reception face of) the photodiode 34 through reflection by the reflection groove 33. In particular, the photodiode 34 receives the light from the other output path of the MMI coupler 4i through the reflection groove 33 and monitors the light amount of the received light and then outputs a result of the monitoring to the control section 35.

Figure 10:
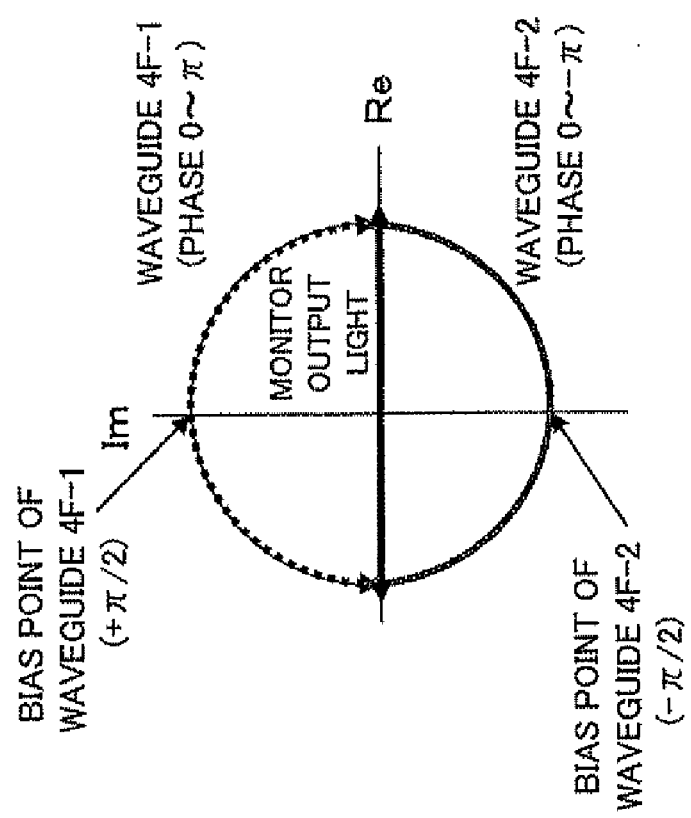
FIG. 10 is a view illustrating control of a bias voltage by a controlling section in the fourth embodiment.

The control section 35 controls the bias voltage to be supplied to the comb-tooth electrodes 31 and 32 based on the monitoring result of the light amount from the photodiode 34 described above so that a matched phase relationship may be established between lights themselves which propagate in the branching waveguides 4f-1 and 4f-2. In other words, the electric fields to be applied to the branching waveguides 4f-1 and 4f-2 through the comb-tooth electrodes 31 and 32 which form the control electrodes are controlled based on the monitoring result from the photodiode 34. FIG. 10 is a view illustrating control of the bias voltage by the control section 35.

When the clock electric signal [0] is supplied from the clock signal source 8 and light whose phase modulation amount is [0] as a result of modulation by the phase modulation section 7 is outputted from the MMI coupler 4i which forms the coupling portion 4i, the intensity of the light outputted from the MMI coupler 4i to the Mach-Zehnder interferometer 13 is [1] (refer to time point t2 in (c) of FIG. 2). However, the light amount of the light incoming from the MMI coupler 4i to the photodiode 34 through reflection groove 33 conversely becomes [0].

In particular, as seen in FIG. 10, the light phase of the propagation light is controlled so that, when the phase state of the light phase modulation cycle of the light propagating in the branching waveguide 4f-1 is $\pi/2$ (refer to time point t2 in (c) of FIG. 2), the monitoring output light becomes minimum, but, when the phase state of the light phase modulation cycle of the light propagating in the branching waveguide 4f2 is $\pi/2$ (refer to time point t2 in (c) of FIG. 2), the monitoring output light becomes minimum.

Since, in the optical waveguide device 30 configured in such a manner as described above, a working effect similar to that achieved by the optical waveguide device 20 according to the third embodiment can be exhibited. In addition, since control for establishing a matched phase relationship when propagation lights from the branching waveguides 4f-1 and 4f-2 are coupled to each other by the coupling portion 4i can be carried out using electric fields to be applied through the comb-tooth electrodes 31 and 32 as control electrodes, there is also an advantage that the accuracy of a waveform of an RZ optical clock signal to be outputted can be increased.

Figure 11:
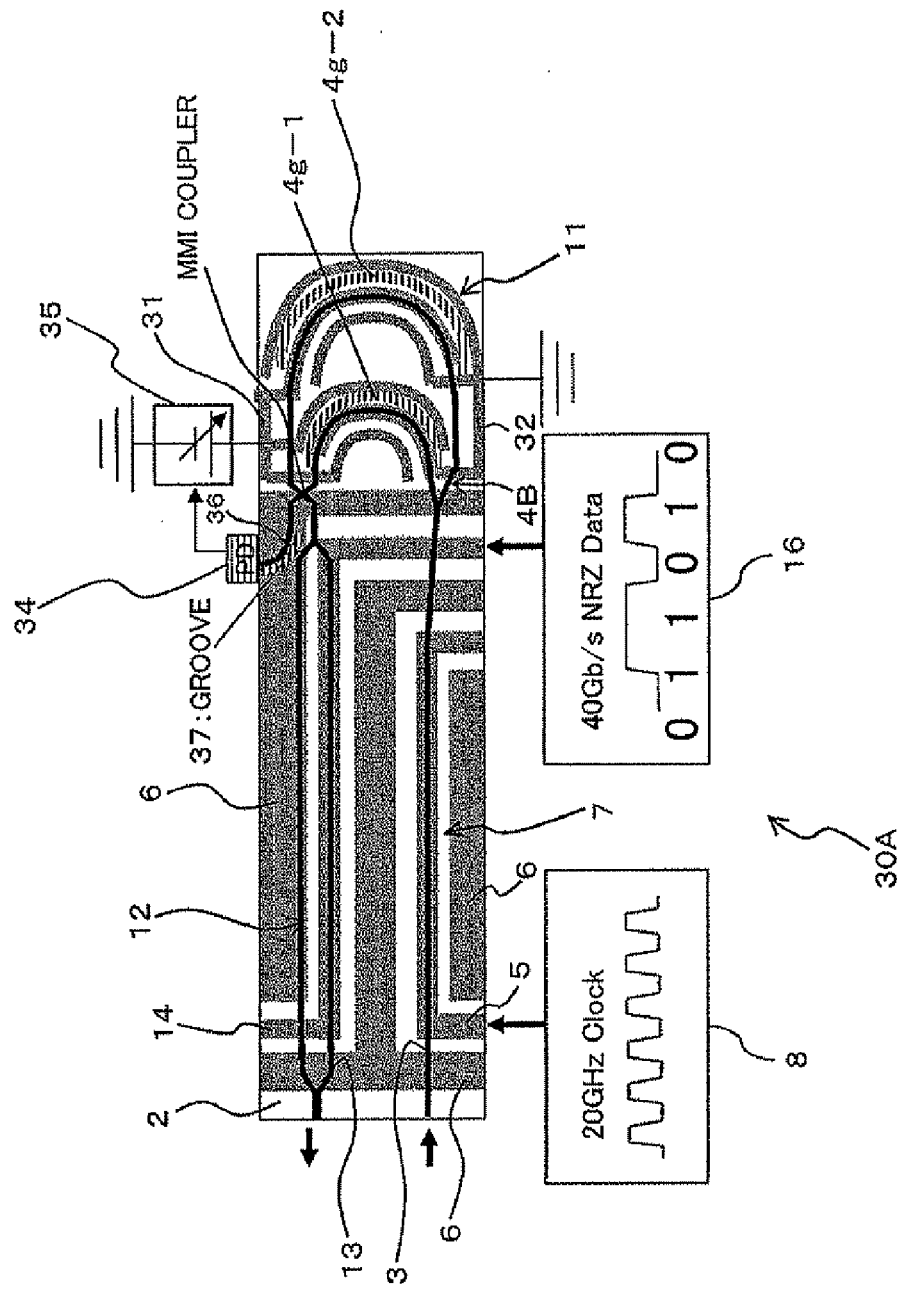
FIG. 11 is a view showing an optical waveguide device according to a modification to the fourth embodiment of the present invention.

It is to be noted that, while the fourth embodiment described above is configured such that the other output light used for monitoring from between the two output lights outputted from the MMI coupler 4i is inputted to the photodiode 34 through reflection by the reflection groove 33, a curved single-mode waveguide 36 for propagating the monitor light so that the output of the MMI coupler 4i is optically connected as it is to (the light reception face of) the photodiode 34 provided on the side face of the substrate 2 may be provided, for example, similarly as in an optical waveguide device 30A seen in FIG. 11. Further, reference numeral 37 denotes a groove formed at a curved outer peripheral portion of the single-mode waveguide 36, and the confining effect of the monitor light propagating in the single-mode waveguide 36 is promoted by the groove 37. It is to be noted that, in FIG. 11, like elements to those in FIG. 9 are denoted by substantially like reference characters.

[E] OTHERS

In order to the embodiments described hereinabove, the present invention can be carried out in various modified forms without departing from the scope of the present invention.

For example, in the optical waveguide devices according to the embodiments described above, the clock electric signal to be supplied from the clock signal supplying source 8 may be set so as to have a frequency corresponding to 10 GHz which is one fourth the frequency (40 GHz) of the clock optical signal to be outputted, and the voltage value (amplitude value) of the electric signal may be set within a range of 2 V $\pi$ (+V $\pi$ to −V $\pi$). In particular, in the conventional technique described hereinabove with reference to FIG. 12, where the clock modulator 100 is driven with an electric signal having a frequency corresponding to one fourth the frequency of the clock optical signal, it is necessary to vary the voltage value within a range (amplitude is 4 V $\pi$) equal to twice the range of 2 V $\pi$ illustrated in A of FIG. 13. On the other hand, with the configuration described hereinabove with reference to FIG. 1 or 4, in order to obtain a similar clock optical signal, it is only necessary to supply the clock electric signal having a driving voltage amplitude equal to one half the driving voltage amplitude of the conventional technique, then the modulation efficiency for the driving voltage can be improved from that of the conventional technique.

Further, while, in the third embodiment described above, the groove is formed along the outer periphery of the branching waveguides which form the Mach-Zehnder interferometer, the width of the groove can be set suitably such that, in order to prevent invasion of the groove formed along the outer periphery of the branching waveguide which forms the inside path in the curve direction into the region of the branching waveguide which forms the outside path in the curved direction, the width of the groove is set, for example, to 20 µm or less.

Further, in the optical waveguide devices configured as the CS-RZ optical modulators according to the third and fourth embodiments described above, while operation in a broadband is required for the data modulation section 12, a preferable response characteristic in a frequency of an input signal is required for the clock modulation section 11. Accordingly, it is desirable to carry out the electrode design of the modulation sections 11 and 12 in accordance with an object of use for each of the modulation sections. In the case of the present invention, the frequency of the clock electric signal in the modulation section 11 is one half or one fourth the NRZ data modulation speed. Therefore, the clock modulation section 11 can be designed such that the modulation band thereof is narrower than that of the data modulation section 12 while making it possible to prioritize reduction of the driving voltage instead.

As a particular technique, a technique wherein the thickness of the electrodes 5, 6, 14 and 15 is made different between the clock modulation section 11 and the data modulation section 12, another technique wherein the distances between the electrodes 5 and 14 and the ground electrodes 6 (15) are made different from each other, or a further technique wherein the lengths of the electrodes 5 and 14 are made different from each other, can be applied. In this instance, the technique disclosed in Japanese Patent Laid-Open No. 2003-262841 and invented by the inventors of the present patent application can also be applied.

Further, the Mach-Zehnder interferometer 4C shown in FIG. 7 certainly can be applied to the configurations of the third and fourth embodiments as well in order to improve the characteristic of the extinction ratio.

In addition, the apparatus of the claimed invention can be fabricated by a person skilled in the art based on the disclosure of the embodiments described above.

What is claimed is:

1. An optical waveguide device, comprising:
   a substrate having an electro-optic effect;
   an optical waveguide formed on said substrate;
   an electrode section adapted to supply an electric field for carrying out phase modulation, synchronized with a clock signal to said optical waveguide and having a phase modulation amplitude of $\pi$, to light propagating through the optical waveguide; and
   a Mach-Zehnder interferometer connected to the downstream side of said optical waveguide and including two branching waveguides having optical lengths different from each other by an optical length corresponding to a half wavelength of the clock signal, a branching portion adapted to branch propagation light from said optical waveguide into two propagation lights and connect the two propagation lights individually to said two branching waveguides, a coupling portion adapted to couple said branching waveguides and generate a clock modulation light having a light intensity that is switched on and off in a cycle equal to twice a frequency of the clock signal, and a single-mode waveguide connected to said coupling portion and adapted to propagate the clock modulation light.

2. The optical waveguide device as claimed in claim 1, wherein said two branching waveguides of said Mach-Zehnder interferometer have a difference in waveguide length therebetween by which the difference between the optical lengths is provided.

3. The optical waveguide device as claimed in claim 1, wherein said two branching waveguides of said Mach-Zehnder interferometer have a refraction index difference therebetween by which the difference between the optical lengths is provided.

4. An optical waveguide device, comprising:
   a substrate having an electro-optic effect;
   a clock modulation section formed on said substrate and adapted to carry out clock modulation for input light; and
   a data modulation section adapted to carry out data modulation for the light modulated by said clock modulation section; and wherein said clock modulation section includes:
   an optical waveguide formed on said substrate;
   an electrode section adapted to supply an electric field for carrying out phase modulation synchronized with a clock signal to said optical waveguide; and
   a Mach-Zehnder interferometer connected to the downstream side of said optical waveguide and including two branching waveguides having an optical length difference therebetween which corresponds to a half wavelength of the clock signal for clock modulation.

5. The optical waveguide device as claimed in claim 4, wherein said two branching waveguides which form the Mach-Zehnder interferometer are configured as waveguides curved and folded back to one direction, and an outside one of the two curved and folded back branching waveguides is configured as a branching waveguide having an optical length greater than that of the inside one of the two curved and folded back branching waveguide.

6. The optical waveguide device as claimed in claim 5, wherein a groove is formed on the outer periphery side of each of said branching waveguides.

7. The optical waveguide device as claimed in claim 5, wherein the outside curved and folded back branching waveguide includes an S-shaped waveguide provided on each of the upstream and downstream sides thereof, and further includes a curved waveguide which connects the S-shaped waveguides on the upstream and downstream sides to each other and has a curve diameter substantially equal to that of the inside curved and folded back branching waveguide.

8. The optical waveguide device as claimed in claim 4, further comprising a control electrode adapted to apply a control electric field to said two branching waveguides which form said Mach-Zehnder interferometer.

9. The optical waveguide device as claimed in claim 8, wherein said control electrode includes three first voltage application electrodes and three second voltage application electrodes disposed alternately, and said first voltage application electrodes and said second voltage application electrodes are disposed such that electric fields having directions reversed from each other are applied to said two branching waveguides.

10. The optical waveguide device as claimed in claim 8, further comprising:
    a light reception device adapted to monitor output light from said Mach-Zehnder interferometer; and
    a control section adapted to control an electric field to be applied through said control electrode based on a result of the monitoring by said light reception device.

11. The optical waveguide device as claimed in claim 10, wherein said Mach-Zehnder interferometer includes, in addition to said two branching waveguides, a branching portion adapted to branch propagation light from said optical waveguide into two propagation lights and connect the two propagation lights to said two branching waveguides and a coupling portion adapted to couple the two branching waveguides and guide light from said branching waveguides through two output paths thereof, and
    one of said two output paths of said coupling portion is connected to said data modulation section and the other one of said two output paths is optically connected to said light reception device.

12. The optical waveguide device as claimed in claim 11, wherein said coupling portion is a multimode interference type coupler having two inputs and two outputs.

13. The optical waveguide device as claimed in claim 4, further comprising:
    a clock signal source adapted to generate the clock signal to be supplied to said electrode portion; and wherein
    the clock signal has a frequency corresponding to ½ or ¼ a bit rate of said data modulation section.

14. The optical waveguide device as claimed in claim 4, wherein a bandwidth of said clock modulation section is narrower than that of said data modulation section.

* * * * *